Oct. 31, 1961 R. S. LOGAN 3,006,952
FILTRATION PROCESS
Filed Nov. 25, 1957
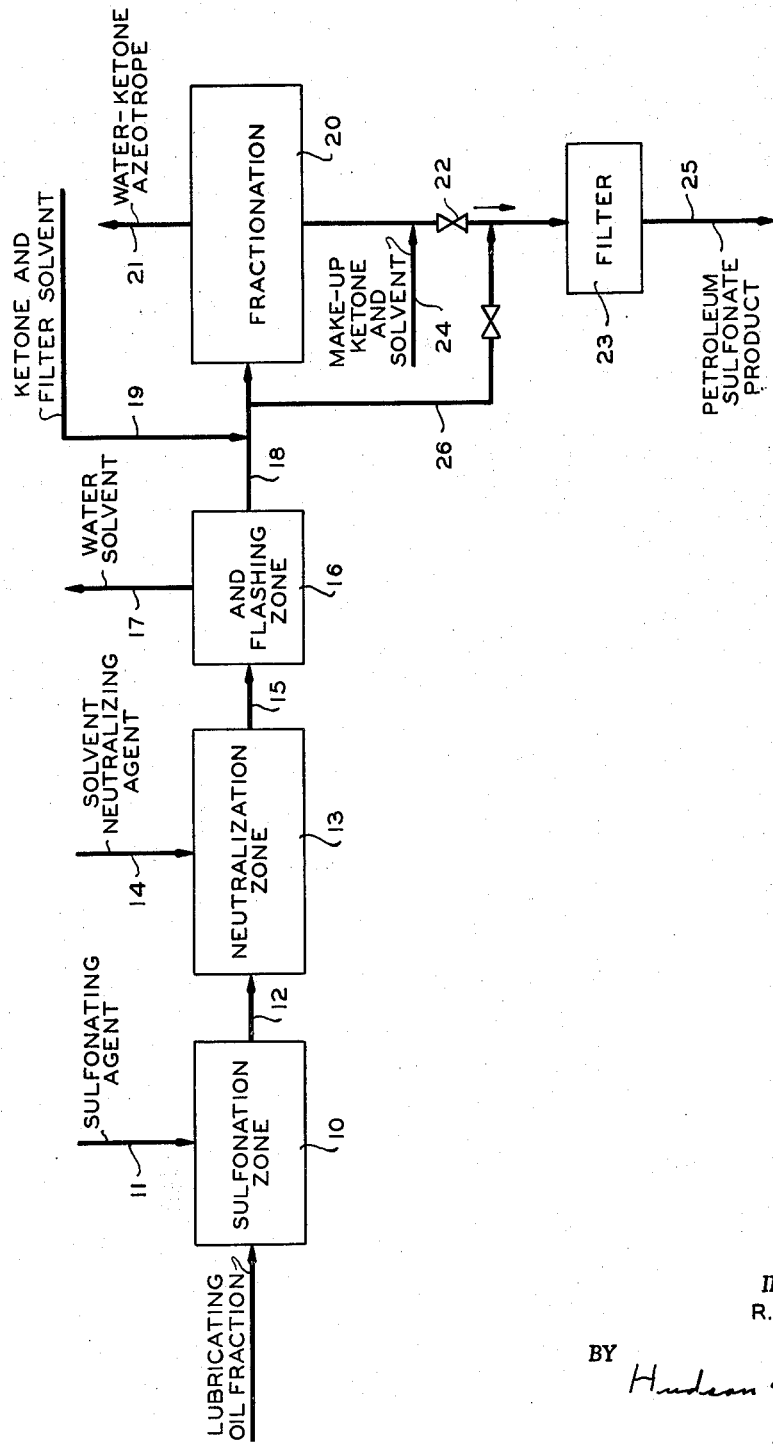
INVENTOR.
R. S. LOGAN
BY Hudson & Young
ATTORNEYS.

United States Patent Office 3,006,952
Patented Oct. 31, 1961

3,006,952
FILTRATION PROCESS
Richard S. Logan, Bartlesville, Okla., assignor to Phillips Petroleum Company, a corporation of Delaware
Filed Nov. 25, 1957, Ser. No. 698,605
9 Claims. (Cl. 260—504)

This invention relates to a filtration process. In another aspect, it relates to an improved method of making a metal petroleum sulfonate.

Metal petroleum sulfonates are widely used in the manufacture of lubricating oil additives and greases. In making lubricating oil additives, a metal petroleum sulfonate of rather high ash content is desirable to obtain improved results in the well known L-1 diesel test for lubricating oils. The ash content is the amount of material remaining after combustion of the metal petroleum sulfonate, and indicates the amount of metal incorporated therein.

In filtering slurries of the metal petroleum sulfonates by conventional methods, an appreciable portion of high-ash material is retained in the filter medium, filter precoat or filter cake. Therefore, such retention of the material reduces the final ash content of the filtrate.

I have discovered that addition of a ketone having 4 to 10 carbon atoms to a slurry of metal petroleum sulfonate prior to filtration gives a very decided increase in the ash content of the product recovered from the filter, thereby improving the properties of lubricating oil additives separated from the filtrate and improving the filtration rate. Also, when the slurry containing the ketone is heated prior to the filtration step and then flashed or distilled, the filtration rate is further improved. This may result from the formation of a water-ketone azeotrope which goes overhead in the flash or distillation step.

Accordingly, it is an object of the invention to provide an improved filtration process yielding lube oil additives of high ash content.

It is a further object to improve the filter rate of slurries containing metal petroleum sulfonates.

It is a still further object to effect economies in the processing of metal petroleum sulfonates, while simultaneously improving the properties of the product.

Various other objects, advantages and features of the invention will become apparent from the following detailed description taken in conjunction with the accompanying drawing in which:

The figure is a block diagram of the process of the invention.

Broadly speaking, the invention involves addition of a ketone having 4 to 10 carbon atoms to a metal petroleum sulfonate which may contain a small amount, say ½ to 3 percent, of water on a solvent free basis. Due to volatility considerations, ketones of 5 to 10 carbon atoms can be most advantageously employed. The slurry is then fed directly to a filter, or it is first heated and then fractionated or flashed to permit formation of a water-ketone azeotrope.

Specific examples of ketones which are useful in practicing the invention are methyl isobutyl ketone, methyl isopropyl ketone, diethyl ketone, isobutylhexyl ketone, and various other dialkyl ketones which constitute a particularly advantageous class of treating agents for commercial practice of the present invention. However, ketones containing an aromatic group are applicable, specifically acetophenone. Also, in a broad aspect of the invention, the hydrocarbon groups can be unsaturated in character. For example, propenyl isobutyl ketone and methyl butenyl ketone are suitable treating agents. Also, the alkyl groups can be substituted with non-interfering substituents, such as halogen, methoxy, or amine groups provided that the total number of carbon atoms does not exceed 10.

In carrying out the novel filtration step, the metal petroleum sulfonate is slurried with an inert hydrocarbon solvent containing 10 to 50, preferably 20 to 40, parts by weight of the ketone treating agent. Specific examples of suitable hydrocarbon solvents are Stoddard solvent, petroleum naphtha, kerosene, cyclohexane, and light alkylate fractions.

The amount of solvent-ketone mixture may be just sufficient to form a slurry, a minimum amount of ½ part by weight of mixture per part of metal petroleum sulfonate being required for this purpose. In commercial operations, about 2 parts of solvent-ketone mixture are used per part of metal petroleum sulfonate.

Where the solvent-ketone mixture contains more than 50 percent ketone, the ash content of the filtrate is reduced to an undesirable extent as compared with the results obtained where 10 to 50 parts by weight of the ketone are employed although improved filterability is still obtained. In addition to the desirable effect of improving the ash content of the metal petroleum sulfonate, an additional desirable increase in filterability is obtained when the ketone-containing slurry is heated to a temperature in excess of 150° F. prior to the filtration step, and the material is then flashed or otherwise fractionated before contacting the filter medium. It is believed that an azeotrope is formed with the ketone and small amounts of water present in the metal petroleum sulfonate, which amounts of water may vary from 0.5 to 3.0 percent on a solvent free basis, usually 1.0 to 2.0 percent. Whether or not this explanation is correct, a desirable increase in filterability is obtained by practicing the aforementioned heating and flashing step in conjunction with ketone addition.

Improved results may also be obtained as to filterability by more complete dehydration of the filter feed as by azeotroping the mixture containing the metal petroleum sulfonate with benzene, by prolonged heating and stripping in Stoddard solvent at 300° F., or by vacuum flash vaporization at about 340° F. and a pressure of 7 inches of mercury (absolute). However, unless the ketone is added, the high ash sulfonates will not pass through the filter cake.

The following specific example is exemplary of the results obtained by practicing this invention.

A solvent refined, dewaxed lubricating oil fraction derived from Mid-Continent petroleum having a viscosity of 203 SUS at 210° F. and a viscosity index of 93 is sulfonated continuously with 20 percent oleum. The acid to oil weight ratio is 0.4. The temperature of the reaction is controlled at 130° F. and the pressure at 35 p.s.i.g. The total reaction time is 89 minutes, including the mixing and soaking period.

Effluent from the sulfonation unit is neutralized continuously with a stream of lime slurry (20.1 weight percent hydrated lime, 23.2 weight percent Stoddard solvent and 56.7 weight percent water). Rates are adjusted so the lime supplied is 175 weight percent in excess of that required to neutralize the titratable acidity of the sulfonator effluent.

The neutralized mixture, after a reaction time of 20 minutes, is heated to 320° F. for 10 minutes and 380° F. for 4 minutes (liquid phase), then flashed to remove water and solvent.

A sample of this product containing approximately 3 weight percent water is used for filtration with methyl isobutyl ketone and Stoddard solvent as filter solvents. The results are reported in the following table.

| Percent methyl isobutyl ketone in ketone-Stoddard Mixture | Filter feed temperature, 220° F. | |
|---|---|---|
| | Filterability | Sulfated ash analysis of solvent free filtrate |
| 0 | Fair | 4.6 |
| 12.5 | Good | 7.1 |
| 20 | Good | 7.5 |
| 25 | Good | 7.8 |
| 30 | Good | 7.7 |
| 37.5 | Good | 7.6 |
| 50 | Good | 7.0 |

It will be noted that the ash content is increased from 4.6 to 7 percent or above as a result of adding the ketone treating agent of the invention. Also, a definite increase in filterability is noted as a result of heating the filter feed to a temperature of 220° F. and flashing prior to the filtration step. A similar increase in ash content of from about 4 percent to 7 percent and upwards is observed where the ketone-containing slurry is not heated and flashed prior to the filtration step. Here, however, a relatively small increase in filterability is obtained.

Local overheating of the filter feed during dehydration should be avoided, as this greatly decreases the filter rate.

Referring now to the drawing, a lubricating oil fraction is introduced to a sulfonation zone 10 wherein it is contacted with a sulfonating agent introduced through a line 11. The lubricating oil fraction is one having a viscosity of at least 90 SUS at 210° F., more particularly a deasphalted, solvent refined oil having a viscosity of 140 to 720 SUS at 210° F. Preferably and advantageously, I treat a propane-fractionated, solvent-extracted, dewaxed Mid-Continent oil having a viscosity of 200 to 230 SUS at 210° F. and a viscosity index of 85 to 100 or higher.

The sulfonating agent can be fuming sulfuric acid, a mixture of chlorosulfonic acid and sulfur trioxide, or other sulfonating agents known to the art.

A temperature of 58 to 200° F. is suitable for the sulfonation treatment, a more restricted range of 80 to 100° F. being employed in usual commercial operations. Suitable treatment time for the sulfonation is a period of 20 to 90 minutes.

With 20 percent fuming sulfuric acid as the sulfonating agent, the acid-oil ratio can be in the range from about 0.1:1 to about 0.7:1 or even 1:1 to produce the petroleum sulfonates of the invention. The preferred range of acid-oil ratios for the production of metal petroleum sulfonate is in the range of about 0.3 to about 0.6. When an acid-oil ratio greater than about 1:1 is employed, the sulfonate produced is dark, almost black, and tarry in contrast to the red, resinous product obtained employing the preferred acid-oil ratios. When $SO_3$ in $SO_2$ is the sulfonation agent, $SO_3$-oil weight ratios are maintained equivalent to those available from the 20 percent fuming sulfuric acid values described hereinbefore. $SO_3$-oil ratios can be controlled by the rate of circulation of the $SO_3$-containing medium.

The sulfonation reaction can be carried out at atmospheric pressure although pressures greater or less than atmospheric can also be employed if desired. It is usually preferred to carry out the reaction at sufficient pressure to maintain $SO_2$ formed in the reaction in solution.

From the zone 10, the sulfonated material passes through a line 12 to a neutralization zone 13 where it is treated with a neutralizing agent introduced through a line 14. The neutralizing agent is a metal hydroxide or other basic metal compound. Specific examples of suitable metals are calcium, barium, sodium, lithium, chromium, zinc, nickel and lead. Best results are obtained with the alkaline earth hydroxides, specifically calcium hydroxide and barium hydroxide. These materials are introduced in an amount sufficient to neutralize the sulfonated materials being treated, and usually the quantity of neutralizing agent is substantially in excess of that required for neutralization, for example, 150 percent of the quantity theoretically required.

The time required for the neutralization reaction is temperature dependent, 10 minutes being sufficient at 300 to 400° F. while 30 to 40 hours may be required at lower temperatures in the order of 210° F.

The neutralizing agent is introduced as a slurry with a neutral hydrocarbon solvent, such as those already described in connection with the filtration step.

The metal petroleum sulfonate resulting from the neutralization in zone 13 together with oil, water, and inorganic salts is passed through a line 15 to a heating and flashing zone 16 from which water and solvent are withdrawn overhead through a line 17, and the bottom product is removed through a line 18. The temperature and duration of the heating and flashing steps are sufficient to flash off the predominant amount of water present, so that the water content of the metal petroleum sulfonate is reduced to about 0.5 to 3.0 percent on a solvent free basis. Suitable conditions for this purpose are a temperature of 400° F. and atmospheric pressure.

In accordance with the invention, a mixture of the aforedescribed ketone treating agent and inert diluent is passed through the line 19 and forms a slurry with the metal petroleum sulfonate which is introduced into a heating and fractionation zone 20. The temperature in the zone 20 is at least 150° F., 220° F. or higher being advantageous in commercial operations. At these temperatures, a water-ketone azeotrope goes overhead in the flashing step and is withdrawn through a line 21, thus substantially reducing the water content of the metal petroleum sulfonate to less than 0.1 weight percent water on a solvent free basis. The bottom product from the zone 20 is fed through a line provided with a valve 22 to a filter 23, and make-up ketone and solvent mixture is introduced through a line 24 if required to make up the amount lost overhead in the zone 20. In some cases, the effluent from the zone 20 is cooled before it is passed to the filter.

In the filter 23, a filter cake is built up on the filter medium, which can be a filter cloth. Also, the filter medium can be precoated to form an initial layer of solids thereon. Due to the presence of the ketone, the ash content of the filtrate is substantially increased, and the filterability is improved. The filtrate petroleum sulfonate product is recovered from the unit 23 through a line 25.

It is within the scope of the invention to pass the feed directly to the filter 23 from the flashing zone 16, either directly or after cooling. A valved line 26 is provided for this purpose. The high ash content of the product is still obtained by this method, but the filter rate is somewhat reduced. It is still higher, however, than the filter rate obtained in the absence of ketone.

It will be apparent, therefore, that I have achieved the objects of the invention in improving the filterability of metal petroleum sulfonate slurries, and also provided a means of increasing the ash content of the material after it has been filtered. In this fashion, decided economies of manufacture are provided in the commercial production of lubricating oil additives.

While the invention has been described in connection with a present, preferred embodiment thereof, it is to be understood that this description is illustrative only and is not intended to limit the invention.

I claim:

1. The method of filtering a metal petroleum sulfonate selected from the group consisting of alkaline earth metal petroleum sulfonates, sodium petroleum sulfonates, lithium petroleum sulfonates, chromium petroleum sulfonates, zinc petroleum sulfonates, nickel petroleum sulfonates and lead petroleum sulfonates, said petroleum sulfonate containing inorganic salts which comprises forming a slurry containing said salts, said sulfonate and a hydrocarbon solvent containing 10 to 50 percent by weight of a dialkyl ketone having 4 to 10 carbon atoms, passing said slurry through a filter medium having a layer of solids thereon, and recovering a filtrate of high ash content, the cation of said inorganic salts being the same as that of said sulfonate.

2. The method of filtering an alkaline earth metal petroleum sulfonate containing inorganic salts which comprises forming a slurry containing said salts, said sulfonate and a hydrocarbon solvent containing 10 to 50 percent by weight of a dialkyl ketone having 5 to 10 carbon atoms, passing said slurry through a filter medium having a layer of solids thereon, and recovering a filtrate of high ash content, the cation of said inorganic salts being the same as that of said sulfonate.

3. The method of filtering a calcium petroleum sulfonate containing inorganic salts which comprises forming a slurry containing said salts, said sulfonate and a hydrocarbon solvent containing 10 to 50 percent by weight of methyl isobutyl ketone, passing said slurry through a filter medium having a layer of solids thereon, and recovering a filtrate of high ash content, the cation of said inorganic salts being the same as that of said sulfonate.

4. The method of filtering a metal petroleum sulfonate selected from the group consisting of alkaline earth metal petroleum sulfonates, sodium petroleum sulfonates, lithium petroleum sulfonates, chromium petroleum sulfonates, zinc petroleum sulfonates, nickel petroleum sulfonates and lead petroleum sulfonates, said petroleum sulfonate containing inorganic salts which comprises forming a slurry containing said salts, said sulfonate and a hydrocarbon solvent containing 10 to 50 percent by weight of a dialkyl ketone having 4 to 10 carbon atoms, heating said slurry to a temperature of at least 150° F., flashing the heated slurry, passing the flashed slurry through a filter medium having a layer of solids thereon, and recovering a filtrate of high ash content.

5. The method of filtering an alkaline earth metal petroleum sulfonate containing inorganic salts which comprises forming a slurry containing said salts, said sulfonate and a hydrocarbon solvent containing 10 to 50 percent by weight of a dialkyl ketone having 5 to 10 carbon atoms, heating said slurry to a temperature of at least 150° F., flashing the heated slurry, passing the flashed slurry through a filter medium having a layer of solids thereon, and recovering a filtrate of high ash content.

6. The method of filtering calcium petroleum sulfonate containing inorganic salts which comprises forming a slurry containing said salts, said sulfonate and a hydrocarbon solvent containing 10 to 50 percent by weight of methyl isobutyl ketone, heating said slurry to a temperature of at least 150° F., flashing the heated slurry, passing the flashed slurry through a filter medium having a layer of solids thereon, and recovering a filtrate of high ash content.

7. The method of making a metal petroleum sulfonate which comprises sulfonating a lubricating oil fraction having a viscosity of at least 90 SUS at 210° F., neutralizing the sulfonation product with an alkaline earth metal hydroxide, separating water from the neutralization product, adding a hydrocarbon solvent containing 10 to 50 weight percent of a dialkyl ketone having 4 to 10 carbon atoms to the neutralization effluent from which water has been separated, passing the resulting slurry through a filter medium having a layer of solids deposited thereon, and recovering a filtrate of high ash content.

8. The method of claim 7 wherein the lubricating oil fraction is a propane-fractionated, solvent-extracted, dewaxed Mid-Continent oil having a viscosity of 200 to 230 SUS at 210° F., the neutralizing agent is calcium hydroxide, and the ketone is methyl isobutyl ketone.

9. A method according to claim 2 wherein said slurry contains up to 3 percent water on a solvent free basis.

References Cited in the file of this patent
UNITED STATES PATENTS

| | | |
|---|---|---|
| 2,307,953 | Potter | Jan. 12, 1943 |
| 2,373,793 | Susie | Apr. 17, 1945 |
| 2,713,035 | Clarke | July 12, 1955 |
| 2,738,326 | Anderson et al. | Mar. 13, 1956 |
| 2,834,803 | Crosby et al. | May 13, 1958 |
| 2,880,173 | Honeycutt | Mar. 31, 1959 |